US009671988B2

(12) United States Patent
Minami et al.

(10) Patent No.: US 9,671,988 B2
(45) Date of Patent: Jun. 6, 2017

(54) IMAGE FORMING APPARATUS WITH PREVIEW IMAGE

(71) Applicant: KYOCERA Document Solutions Inc., Osaka-shi, Osaka (JP)

(72) Inventors: Takahiro Minami, Osaka (JP); Yasuhide Sato, Osaka (JP); Akira Yuki, Osaka (JP); Yoshihiko Arai, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 15/164,766

(22) Filed: May 25, 2016

(65) Prior Publication Data
US 2016/0350044 A1    Dec. 1, 2016

(30) Foreign Application Priority Data

May 27, 2015    (JP) ................. 2015-107524

(51) Int. Cl.
*G06F 3/12*    (2006.01)
*H04N 1/00*    (2006.01)

(52) U.S. Cl.
CPC .......... *G06F 3/1256* (2013.01); *G06F 3/1208* (2013.01); *H04N 1/0044* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

2009/0190177 A1*    7/2009    Hayashi ............. H04N 1/21
                                             358/1.16
2011/0292444 A1*    12/2011    Koarai ............. G06F 3/1208
                                             358/1.15

FOREIGN PATENT DOCUMENTS

JP    2009170957 A    7/2009

\* cited by examiner

*Primary Examiner* — Andrew H Lam
(74) *Attorney, Agent, or Firm* — Alleman Hall Creasman & Tuttle LLP (57) ABSTRACT

An image forming apparatus includes a storage portion, a preview image generating circuit, an output image generating circuit, a data information obtaining circuit, and a display circuit. The storage portion stores image data that is an output target. The preview image generating circuit generates a preview image from the image data based on an output setting. The output image generating circuit generates an output image from the image data based on the output setting. The data information obtaining circuit obtains data information from output image data of the output image, and discards the output image data from which the data information was obtained. The display circuit displays the data information together with the preview image.

8 Claims, 8 Drawing Sheets

IMAGE FORMING APPARATUS WITH PREVIEW IMAGE

INCORPORATION BY REFERENCE

This application is based upon and claims the benefit of priority from the corresponding Japanese Patent Application No. 2015-107524 filed on May 27, 2015, the entire contents of which are incorporated herein by reference.

BACKGROUND

The present disclosure relates to an image forming apparatus and an image forming program for displaying a preview image based on image data.

A typical image forming apparatus can store image data read by a scanner or received from an external information processing apparatus, and output the stored image data by facsimile transmission, electronic mail transmission or the like.

There is known a typical image forming apparatus that displays a preview image generated based on image data so that a user on the transmission side can confirm an outline of an output image.

However, the user cannot confirm, from the preview image, data information, such as the data size, of the actual output image that affects the output.

SUMMARY

An image forming apparatus according to an aspect of the present disclosure includes a storage portion, a preview image generating circuit, an output image generating circuit, a data information obtaining circuit, and a display circuit. The storage portion stores image data that is an output target. The preview image generating circuit generates a preview image from the image data based on an output setting. The output image generating circuit generates an output image from the image data based on the output setting. The data information obtaining circuit obtains data information from output image data of the output image, and discards the output image data from which the data information was obtained. The display circuit displays the data information together with the preview image.

A recording medium according to another aspect of the present disclosure is a non-transitory computer-readable recording medium storing an image forming program that causes a computer to execute: storing image data that is an output target; generating a preview image from the image data based on an output setting; generating an output image from the image data based on the output setting; obtaining data information from output image data of the output image, and discarding the output image data from which the data information was obtained; and displaying the data information together with the preview image.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The image forming apparatus and the recording medium storing an image forming program according to the present disclosure enable the user to confirm, on the preview image, data information of the actual output image that is generated from the image data. For example, a preview image and an output image are generated from the image data based on an output setting, data information of the generated output image is obtained, the output image for which the data information was obtained is discarded, and the data information is displayed together with the preview image.

[Image Forming Apparatus]

Figure 1:
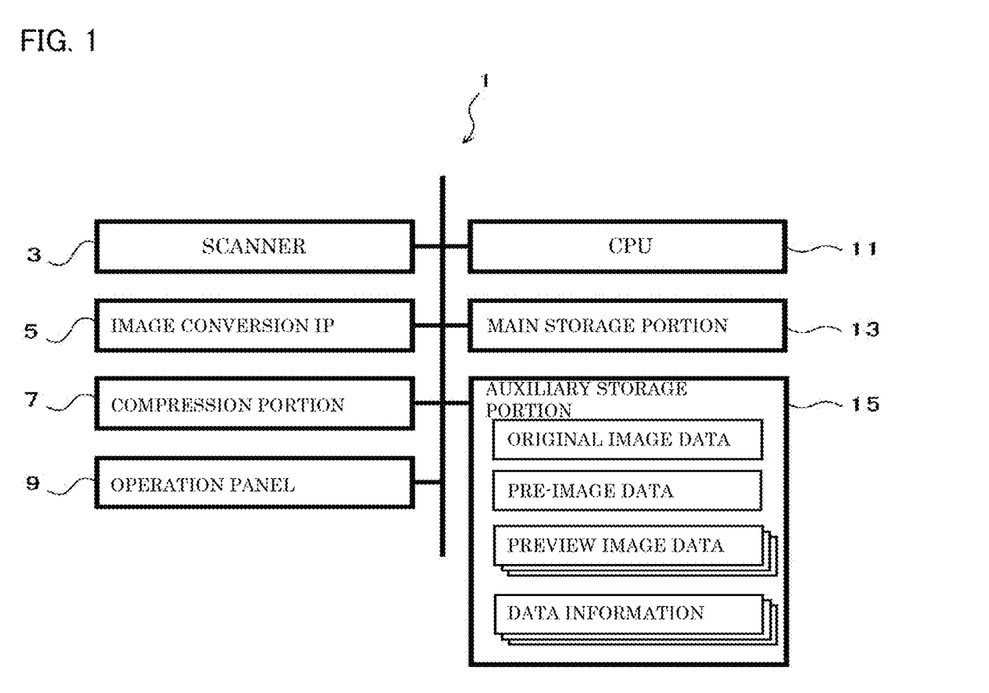
FIG. 1 is a diagram showing an image forming apparatus according to an embodiment of the present disclosure.

FIG. 1 is a diagram showing an image forming apparatus according to an embodiment of the present disclosure.

An image forming apparatus 1 is, for example, a digital multifunction peripheral, and includes a scanner 3, an image conversion IP (Image Processor) 5, a compression portion 7, an operation panel 9, a CPU (Central Processing Unit) 11, a main storage portion 13, and an auxiliary storage portion 15. The image forming apparatus 1 can obtain image data from the scanner 3 and from an external information processing apparatus such as a personal computer, and has various types of output functions to output the obtained image data, such as a print function, a copy function, a facsimile function, and an electronic mail transmission function.

It is noted that the print function and the copy function realize a print output for printing an image on a paper sheet, the facsimile function realizes a facsimile transmission output, and the electronic mail transmission function realizes an electronic mail transmission output. These output functions can be realized by a well-known configuration of image forming apparatus, and thus detailed description thereof is omitted.

In the image forming apparatus 1 of the present embodiment, original image data obtained from the scanner 3 as an output target is stored in the auxiliary storage portion 15, and a preview image and an output image are generated from the original image data.

The scanner 3 is a scanner device that reads an image on a document sheet and generate original image data.

The image conversion IP 5 is a processing module that generates a preview image and an output image from the original image data. The image conversion IP 5 is a circuit that, when the image forming program is executed, operates as a preview image generating portion 17 and an output image generating portion 19 that are described below. That is, the image conversion IP 5 is an example of the preview image generating circuit and the output image generating circuit of the present disclosure. The image forming program is recorded on a non-transitory computer-readable recording medium such as a CD or a DVD, and is stored in the main storage portion 13 from the recording medium. It is noted that in the present embodiment, the "circuit" may be an electronic component or an electronic substrate, such as a processor (such as a CPU) or an ASIC (Application-Specific Integrated Circuit), in which a plurality of electronic elements are connected by wiring. The "circuit" may further read and execute various types of programs, or execute various types of programs that are built therein in advance.

The compression portion 7 is a processing module that performs compression and expansion of image data. In the present embodiment, the image data on which the compression and the expansion are performed is original image data, preview image data, output image data, and pre-image data for preview image that is described below. The original image data, preview image data, output image data and pre-image data for preview image are processed in units of bands, wherein data of one page is divided into a plurality of bands.

The operation panel 9 is an operation/display device having a touch-panel-type screen, and realizes an operation input for the image forming apparatus 1 and displays an operation status. The operation panel 9 of the present embodiment includes a circuit that operates as a display portion for displaying a preview image. That is, the operation panel 9 is an example of the display circuit of the present disclosure.

The CPU 11 is an arithmetic processing device that controls the portions of the image forming apparatus 1 by executing the image forming program. The CPU 11 of the present embodiment is a circuit that, in execution of the image forming program, operates as an image data managing portion 23, a data information obtaining portion 25, and a display managing portion 27. That is, the CPU 11 is an example of the image data managing circuit, the data information obtaining circuit, and the display managing circuit of the present disclosure.

The main storage portion 13 includes, for example, a ROM (Read-Only Memory) storing the image forming program and data that is necessary for processing, and a RAM (Random Access Memory) as a work area. The RAM is used as a work area in the processes for obtaining the output image data, generating a pre-image, generating a preview image, generating an output image, and obtaining data information.

The auxiliary storage portion 15 is a rewritable nonvolatile memory such as a HDD (Hard Disk Drive).

Figure 2:
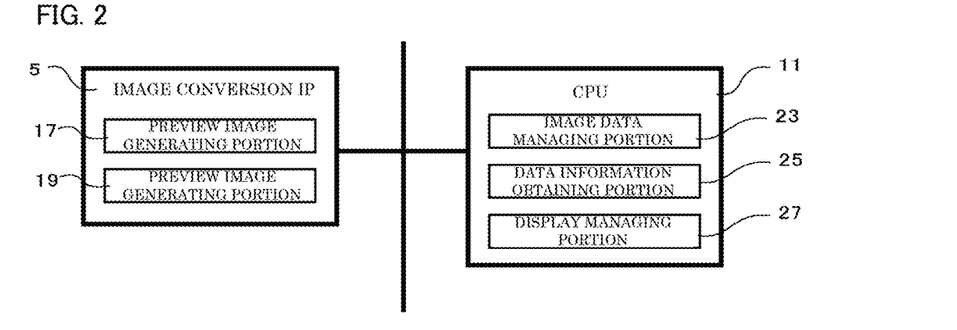
FIG. 2 is a diagram showing details of a CPU and an image conversion IP of the image forming apparatus shown in FIG. 1.
Figure 3:
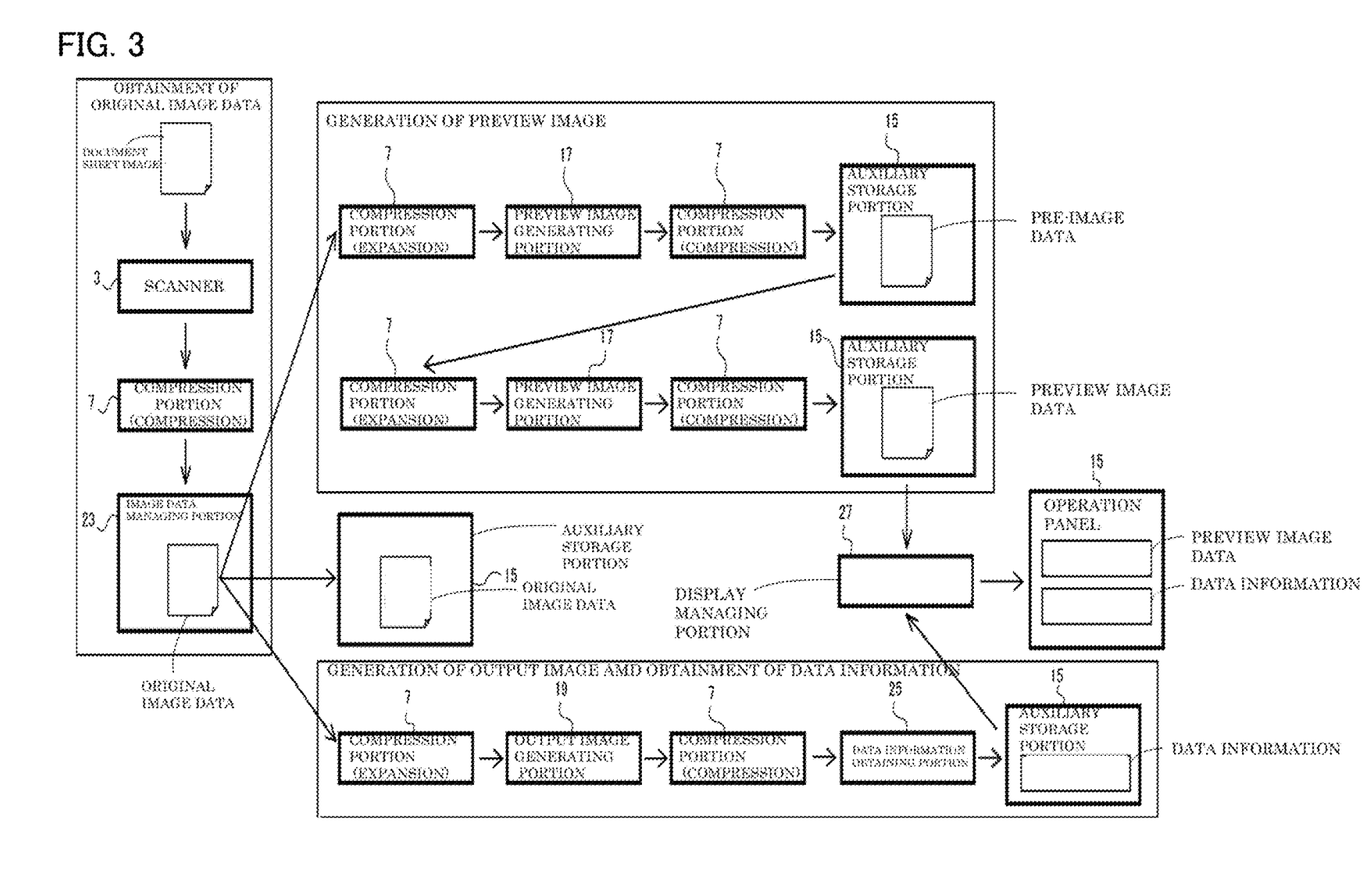
FIG. 3 is a diagram showing processes performed by the CPU and the image conversion IP of FIG. 1.

FIG. 2 is a diagram showing details of the CPU 11 and the image conversion IP 5. FIG. 3 is a diagram showing processes performed by the CPU 11 and the image conversion IP 5.

As described above, the CPU 11 operates as the image data managing portion 23, the data information obtaining portion 25, and the display managing portion 27, and the image conversion IP 5 operates as the preview image generating portion 17 and the output image generating portion 19.

The image data managing portion 23 realizes an image data managing function. That is, the image data managing portion 23 obtains compressed original image data that was generated by the compression portion 7 by compressing the original image data that corresponds to the image read by the scanner 3 from the document sheet. In addition, the image data managing portion 23 passes the obtained compressed original image data to the auxiliary storage portion 15, and to the preview image generating portion 17 and the output image generating portion 19 of the image conversion IP 5.

Upon receiving the original image data, the auxiliary storage portion 15 stores the original image data, whereas the preview image generating portion 17 causes the compression portion 7 to expand the compressed original image data and starts generating a preview image by using the original image data, and the output image generating portion 19 causes the compression portion 7 to expand the compressed original image data and starts generating an output image by using the original image data. As a result, the image data managing portion 23 allows the storage of the compressed original image data, the generation of the preview image, and the generation of the output image to be executed in parallel.

The preview image generating portion 17 realizes a preview image generating function, and generates a preview image from the original image data based on an output setting. Specifically, the preview image generating portion 17 generates, from the original image data, a pre-image that becomes the base of a preview image, and then, based on the output setting, generates the preview image from the pre-image.

The pre-image corresponds to pre-image data whose resolution is lower than the resolution of the original image data. As a result, when the pre-image is generated, the preview image generating portion 17 generates the pre-image data by performing a reduction process on the original image data. In the present embodiment, a high-quality compression process is performed as the reduction process for the purpose of maintaining the image quality.

In addition, in the present embodiment, when the pre-image data is generated, the compression portion 7 expands the original image data, and the compression portion 7 compresses the generated pre-image data. The pre-image data thus generated is passed to the auxiliary storage portion 15 by the preview image generating portion 17, and is stored therein.

The preview image corresponds to preview image data, which is generated by applying an output setting to the pre-image data. When the preview image data is generated, the compression portion 7 expands the pre-image data and the compression portion 7 compresses the generated preview image data. The preview image data thus generated is passed to the auxiliary storage portion 15 by the preview image generating portion 17, and is stored therein.

In the present embodiment, a plurality of pieces of preview image data are generated in correspondence with a plurality of output settings. The plurality of output settings are different from each other in parameters that affect the data size of the output image, such as a parameter for a color/monochrome setting and a parameter for a resolution setting. The plurality of output settings may be output settings with higher frequencies of use in the image forming apparatus 1.

The output image generating portion 19 realizes an output image generating function, and generates output images from the original image data based on output settings. The output images correspond to output image data, which is generated by applying the output settings to the original image data.

The plurality of output settings that are used for generating the preview image are also used to generate the output images. As a result, the output image generating portion 19 of the present embodiment generates a plurality of pieces of output image data in correspondence with the plurality of output settings. When the output image data is generated, the compression portion 7 expands the original image data, and the compression portion 7 compresses the generated output image data.

The data information obtaining portion 25 realizes a data information obtaining function, obtains data information from output image data, and discards the output image data from which the data information was obtained. Specifically, the data information obtaining portion 25 obtains data sizes as data information from a plurality of pieces of output image data generated by the output image generating portion 19, and discards the plurality of pieces of output image data from which the data sizes were obtained. It is noted that discarding output image data means that the output image data is not stored in the auxiliary storage portion 15. The obtained data information is stored in the auxiliary storage portion 15 by the data information obtaining portion 25.

The display managing portion 27 realizes a display managing function, and passes, to the operation panel 9, a plurality of pieces of preview image data stored in the auxiliary storage portion 15, and data information of a plurality of pieces of output image data that correspond thereto, thereby causing the operation panel 9 to display preview images.

On the screen of the operation panel 9, a plurality of preview images are displayed in alignment based on the plurality of pieces of preview image data (a multi-preview), and a data size that is a piece of data information corresponding to each preview image is displayed on each preview image.

Figure 4:
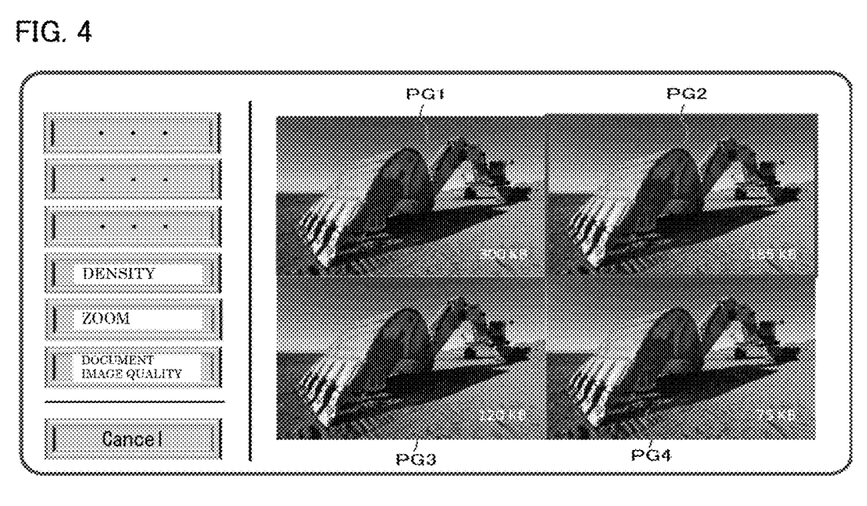
FIG. 4 shows an example of a multi-preview screen provided in the image forming apparatus shown in FIG. 1.

FIG. 4 shows an example of a multi-preview screen. In the example shown in FIG. 4, four preview images PG1, PG2, PG3, and PG4 are displayed in two rows by two columns. On the four preview images, data sizes corresponding to the output settings are displayed, respectively. It is noted that the output settings of the preview images are as follows: the preview image PG1 is set to color and high resolution; the preview image PG2 is set to color and low resolution; the preview image PG3 is set to monochrome and high resolution; and the preview image PG4 is set to monochrome and low resolution. The high resolution and the low resolution mentioned here are relative to each other.

On the preview screen, settings for an image density, a size (zoom), an image quality (resolution) or the like are received. In addition, on the preview screen, the user can input an output request by selecting a preview image. In response to the input of an output request, the output image generating portion 19 generates output image data for an actual output, as described above, and an output with respect to the output image data is performed based on various functions.

[Preview Process]

Figure 5:
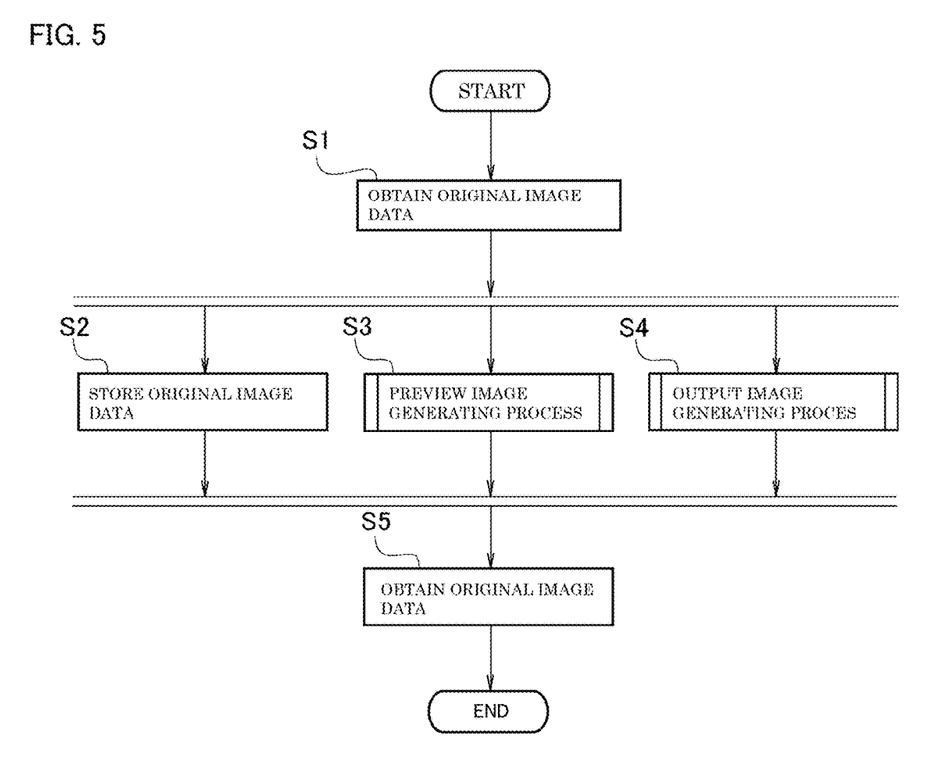
FIG. 5 is a flowchart showing a flow of a preview process performed by the image forming apparatus shown in FIG. 1.
Figure 6:
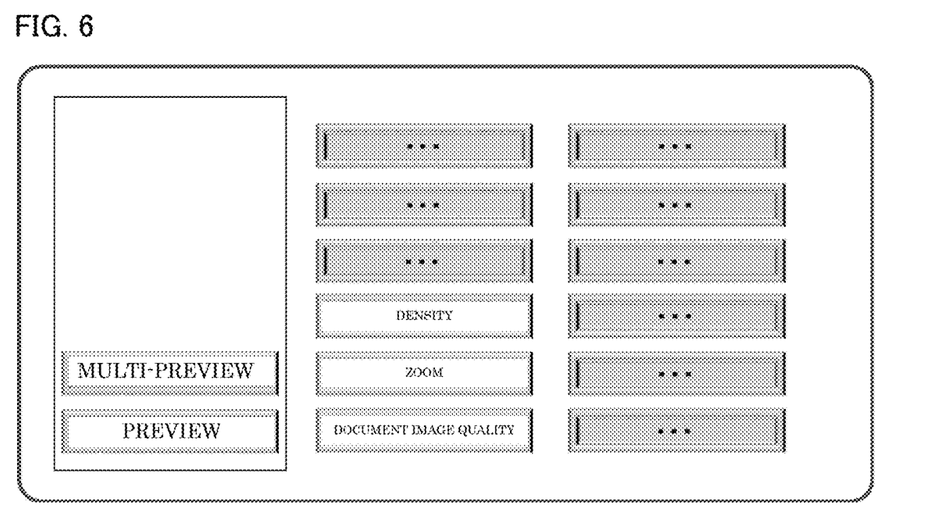
FIG. 6 shows an example of a preview reception screen provided in the image forming apparatus shown in FIG. 1.

FIG. 5 is a flowchart showing a flow of a preview process performed by the image forming apparatus shown in FIG. 1. FIG. 6 shows an example of a preview reception screen. It is noted that the preview reception screen of FIG. 6 is displayed together with a reception screen for image quality and size.

The preview process is started when the user sets a document sheet on the scanner 3, and selects a preview or a multi-preview on the preview reception screen of FIG. 6. In the present embodiment, a description is given for a case where the multi-preview is selected. It is noted that when the preview is selected, the process is performed with regard to a single preview image instead of a plurality of preview images.

In step S1 of the preview process, original image data is obtained. That is, upon selection of the multi-preview on the preview reception screen, the scanner 3 reads an image from the set document sheet and generates document sheet image data. The compression portion 7 generates original image data by compressing the document sheet image data. The original image data thus generated is sent to the image data managing portion 23 of the CPU 11.

Subsequently, a storage of the original image data of step S2, a preview image generating process of step S3, and an output image generating process of step S4 are executed in parallel. That is, the image data managing portion 23 of the CPU 11 passes the original image data to the auxiliary storage portion 15, and to the preview image generating portion 17 and the output image generating portion 19 of the image conversion IP 5. It is noted that the original image data is expanded by the compression portion 7 when it is passed to the preview image generating portion 17 and the output image generating portion 19.

In step S2, the original image data is stored in the auxiliary storage portion 15.

In step S3, the preview image generating portion 17 generates a plurality of pieces of preview image data in correspondence with a plurality of output settings for the original image data. The preview image data is stored in the auxiliary storage portion 15 after being compressed by the compression portion 7. A detail of step S3 is described below.

In step S4, the output image generating portion 19 generates a plurality of pieces of output image data in correspondence with the plurality of output settings for the original image data, and the data information obtaining portion 25 obtains data sizes of the plurality of pieces of output image data. The obtained data sizes are stored in the auxiliary storage portion 15. A detail of step S4 is described below.

After completion of steps S2 to S4, the process moves to step S5.

In step S5, the preview screen is displayed. That is, the display managing portion 27 of the CPU 11 passes a plurality of pieces of preview image data stored in the auxiliary storage portion 15, and data information of corresponding pieces of output image data, to the operation panel 9 such that the preview images are displayed as shown in FIG. 4.

This enables the user to confirm the preview images PG1 to PG4 for different output settings, together with the data information (data sizes).

[Preview Image Generating Process]

Figure 7:
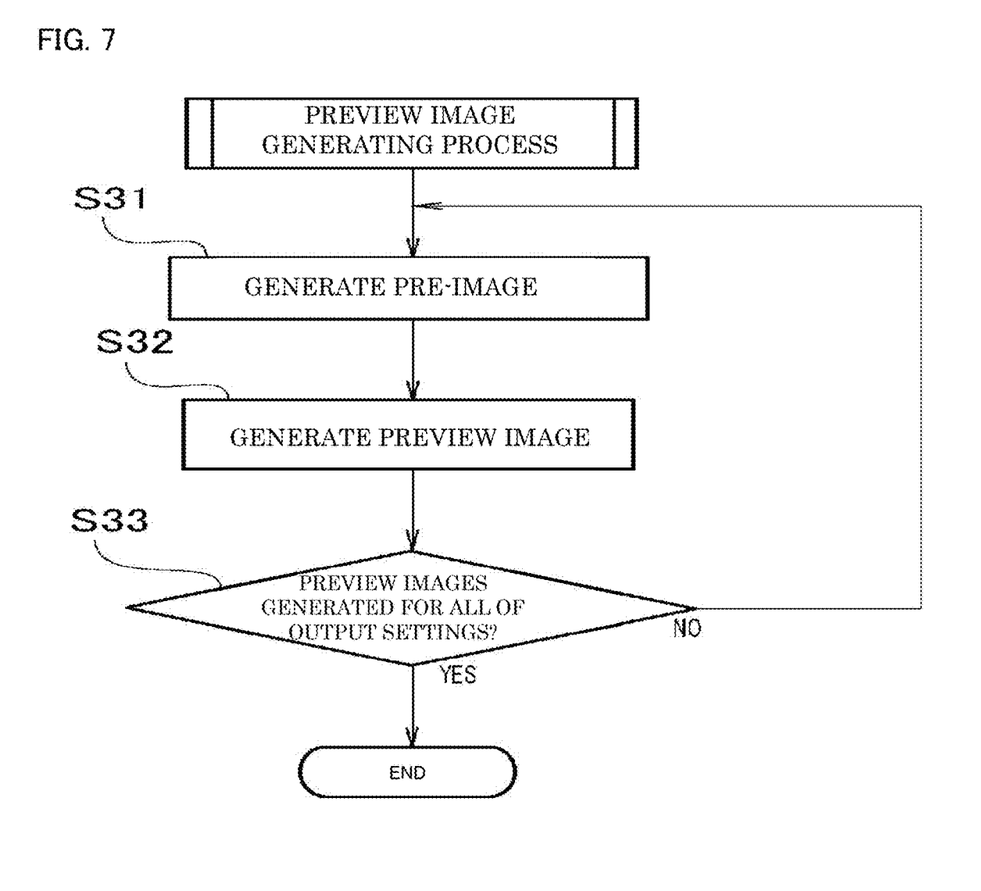
FIG. 7 is a flowchart showing a flow of a preview image generating process of FIG. 5.

FIG. 7 is a flowchart showing a flow of the preview image generating process of FIG. 5.

In the preview image generating process performed in step S3 of FIG. 5, in step S31, a pre-image is generated. That is, first, the preview image generating portion 17 generates pre-image data by performing the reduction process on the original image data received from the image data managing portion 23, and causes the compression portion 7 to compress the generated pre-image data, and then stores the compressed pre-image data in the auxiliary storage portion 15.

Subsequently, in step S32, a preview image is generated. That is, first the preview image generating portion 17 causes the compression portion 7 to expand the compressed pre-image data stored in the auxiliary storage portion 15, and receives the expanded pre-image data. The preview image generating portion 17 then generates preview image data by applying one of a plurality of output settings to the expanded pre-image data. The generated preview image data is compressed by the compression portion 7, and the compressed preview image data is stored in the auxiliary storage portion 15.

In step S33, it is determined whether or not preview images have been generated in correspondence with all of the plurality of output settings. That is, the preview image generating portion 17 determines whether or not preview images have been generated in correspondence with all of the plurality of output settings.

When there is no output setting for which preview image data has not been generated (YES), the preview image generating process ends. When there is at least one output setting for which preview image data has not been generated (NO), the process returns to step S31, and the step is repeated until preview images are generated in correspondence with all of the plurality of output settings.

[Output Image Generating Process]

Figure 8:
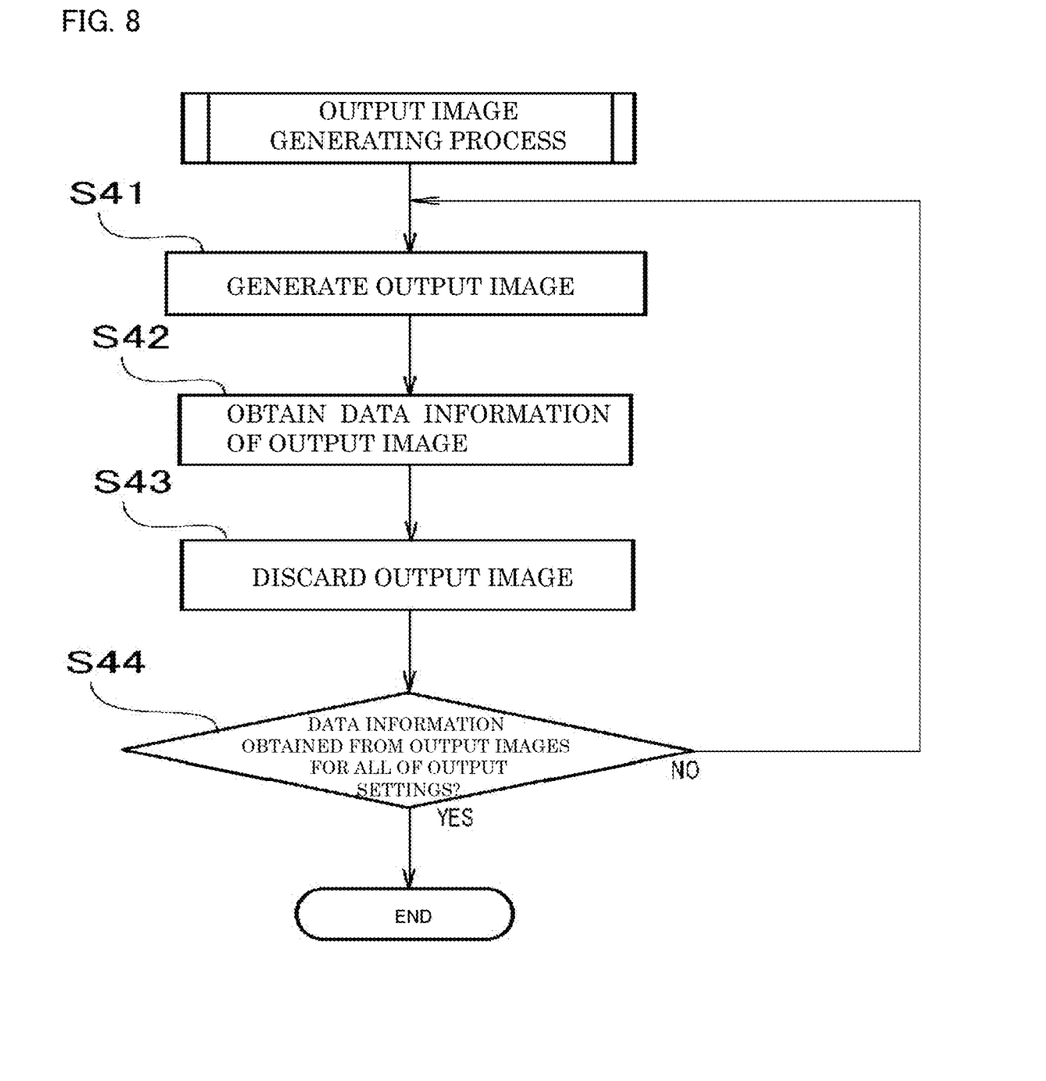
FIG. 8 is a flowchart showing a flow of an output image generating process of FIG. 5.

FIG. 8 is a flowchart showing a flow of the output image generating process of FIG. 5.

In the output image generating process performed in step S4 of FIG. 5, in step S41, an output image is generated. That is, the output image generating portion 19 generates output image data by applying one of the plurality of output settings to the original image data received from the image data managing portion 23.

Subsequently, in step S42, data information of an output image is obtained. That is, first, the data information obtaining portion 25 causes a compressor to compress the generated output image data, and then obtains a data size, as the data information, from the compressed output image data, and stores the obtained data size in the auxiliary storage portion 15.

Subsequently, in step S43, the output image is discarded. That is, the data information obtaining portion 25 discards the output image data from which the data information was obtained, without storing it in the auxiliary storage portion 15.

In step S44, it is determined whether or not data information has been obtained from output images that respectively correspond to all of the plurality of output settings. That is, the preview image generating portion 17 determines whether or not generation of output images and obtainment of data information have been completed in correspondence with all of the plurality of output settings.

When there is no output setting for which generation of output image or obtainment of data information has not been completed (YES), the output image generating process ends. When there is at least one output setting for which generation of output image or obtainment of data information has not been completed (NO), the process returns to step S41, and the step is repeated until generation of output images and obtainment of data information are completed in correspondence with all of the plurality of output settings.

EFFECTS OF EMBODIMENT

As described above, the image forming apparatus 1 of the present embodiment includes: the auxiliary storage portion 15 storing original image data that is an output target; the preview image generating portion 17 generates a preview image from the image data based on an output setting; the output image generating portion 19 that generates an output image from the image data based on the output setting; the data information obtaining portion 25 that obtains a data size as data information from output image data of the output image, and discard the output image data from which the data size was obtained; and the operation panel 9 that displays the data size together with the preview image.

As a result, it is possible for the user to confirm, on the preview image, the data size of the actual output image which is generated from the original image data. In addition, according to the present embodiment, after the data size of the actual output image is obtained, the output image data itself is discarded. As a result, it is possible to avoid both the original image data and the output image data from being stored, and an excessive use of storage space of the auxiliary storage portion 15 is restricted.

In the image forming apparatus 1 of the present embodiment, the preview image generating portion 17 generates a plurality of preview images PG1 to PG4 based on a plurality of output settings, the output image generating portion 19 generates a plurality of output images based on the plurality of output settings, the data information obtaining portion 25 obtains a plurality of pieces of data information from a plurality of pieces of output image data of the plurality of output images, and discards the plurality of pieces of output image data from which the plurality of pieces of data information were obtained, the plurality of pieces of data information being different from each other in correspondence with the plurality of output settings, and the operation panel 9 displays, as a multi-preview, the plurality of preview images in alignment, and displays the plurality of pieces of data information respectively in connection with the plurality of preview images that correspond thereto via the plurality of output settings.

As a result, the multi-preview of the present embodiment makes it possible for the user to compare the plurality of preview images, together with the data information (data sizes) corresponding thereto, with ease and in a reliable manner. In addition, in the multi-preview of the present embodiment, the plurality of pieces of output image data are discarded. This produces an advantageous effect of restricting an excessive use of storage space of the auxiliary storage portion 15.

Furthermore, in the image forming apparatus 1 of the present embodiment, the preview image generating portion 17 generates, from the original image data, a plurality of pieces of pre-image data that have a low resolution and become a base of the plurality of preview images, and generates the plurality of preview images by applying the plurality of output settings to the plurality of pieces of pre-image data respectively.

As a result, it is possible to improve the processing speed for generating a plurality of preview images during the multi-preview.

In addition, in the present embodiment, generation of the preview image and generation of the output image are performed in parallel. It is thus possible to generate the output image and obtain the data size by using the time required for generating the preview image, thereby preventing the processing speed from decreasing.

Furthermore, in the present embodiment, storage of the original image data is also performed parallel to generation of the preview image and generation of the output image. This further prevents the processing speed from decreasing.

It is noted that the original image data may be stored in the auxiliary storage portion 15 in advance, and only the generation of the preview image and the generation of the output image may be performed in parallel. In that case, step S2 of FIG. 5 is omitted.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
    a storage portion storing image data that is an output target;
    a preview image generating circuit that generates a plurality of preview images from the image data based on a plurality of output settings;
    an output image generating circuit that generates a plurality of output images from the image data based on the plurality of output settings;
    a data information obtaining circuit that obtains a plurality of pieces of data information from a plurality of pieces of output image data of the plurality of output images, and discards the plurality of pieces of output image data from which the plurality of pieces of data information were obtained, the plurality of pieces of data information being different from each other in correspondence with the plurality of output settings; and
    a display circuit that displays the plurality of preview images in alignment, and the plurality of pieces of data information respectively in connection with the plurality of preview images that correspond thereto via the plurality of output settings.

2. The image forming apparatus according to claim 1, wherein
    the preview image generating circuit generates, from the image data, a plurality of pieces of pre-image data that have a low resolution and become a base of the plurality of preview images, and generates the plurality of preview images by applying the plurality of output settings to the plurality of pieces of pre-image data respectively.

3. The image forming apparatus according to claim 1, further comprising:
    an image data managing circuit that passes the image data to the preview image generating circuit and the output image generating circuit, and cause the preview image generating circuit and the output image generating circuit to perform, in parallel, generation of the plurality of preview images and generation of the plurality of output images.

4. The image forming apparatus according to claim 1, wherein
    the data information is a data size.

5. A non-transitory computer-readable recording medium storing an image forming program that causes a computer to execute:
    storing image data that is an output target;
    generating a plurality of preview images from the image data based on a plurality of output settings;
    generating a plurality of output images from the image data based on the plurality of output settings;
    obtaining a plurality of pieces of data information from a plurality of pieces of output image data of the plurality of output images, and discarding the plurality of pieces of output image data from which the plurality of pieces of data information were obtained, the plurality of pieces of data information being different from each other in correspondence with the plurality of output settings; and
    displaying the plurality of preview images in alignment, and the plurality of pieces of data information respectively in connection with the plurality of preview images that correspond thereto via the plurality of output settings.

6. The non-transitory computer-readable recording medium according to claim 5, wherein
    the generating of the plurality of preview images comprises generating, from the image data, a plurality of pieces of pre-image data that have a low resolution and become a base of the plurality of preview images, and generating the plurality of preview images by applying the plurality of output settings to the plurality of pieces of pre-image data respectively.

7. The non-transitory computer-readable recording medium according to claim 5, wherein the computer is further caused to execute:
    performing, in parallel, the generating of the plurality of preview images and the generating of the plurality of output images.

8. The non-transitory computer-readable recording medium according to claim 5, wherein
    the data information is a data size.

* * * * *